A. W. CHAPMAN.
SHOCK ABSORBER FOR ROAD VEHICLES.
APPLICATION FILED APR. 10, 1912.

1,042,320.

Patented Oct. 22, 1912.

WITNESSES
Sidney Brooks
J. P. Davis

INVENTOR
Arthur William Chapman
BY
ATTORNEYS

UNITED STATES PATENT OFFICE.

ARTHUR WILLIAM CHAPMAN, OF BIRMINGHAM, ENGLAND.

SHOCK-ABSORBER FOR ROAD-VEHICLES.

1,042,320. Specification of Letters Patent. Patented Oct. 22, 1912.

Application filed April 10, 1912. Serial No. 689,764.

*To all whom it may concern:*

Be it known that I, ARTHUR WILLIAM CHAPMAN, subject of the King of Great Britain, residing at 27 Westfield road, Acock's Green, Birmingham, England, engineer, have invented certain new and useful Improvements Relating to Shock-Absorbers for Road-Vehicles, of which the following is a specification.

This invention has for its object to construct an improved shock absorbing device for use with motor and other road vehicles.

Figure 1:
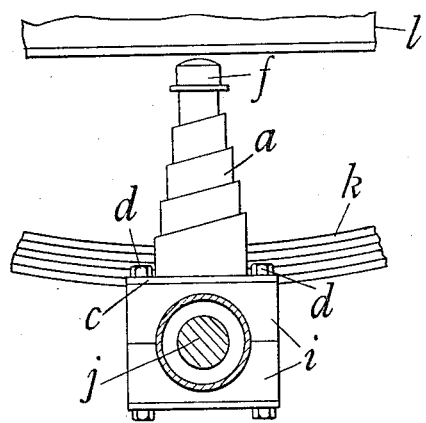
Figure 2:
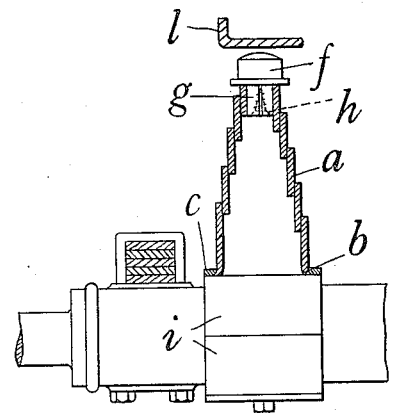

In the accompanying sheet of explanatory drawings:—Figure 1 is a side view of the improvement showing it applied: Fig. 2 is a sectional view of the same: and Figs. 3, 4, 5 and 6 are side views showing different ways of applying the improvement to a vehicle.

The same reference letters in the different views indicate the same parts.

Figure 3:
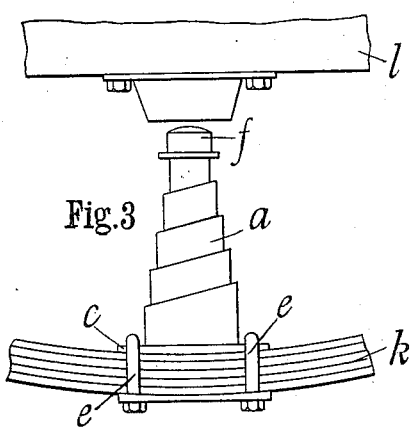
Figure 4:
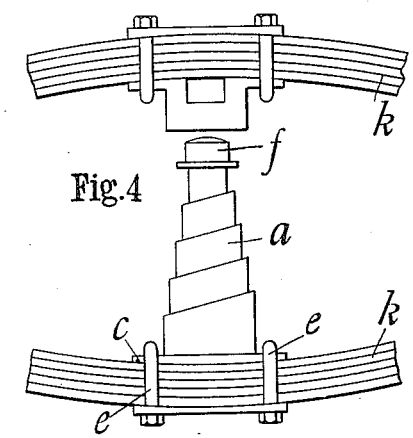

In carrying the invention into effect, the shock absorber consists mainly of a volute spring $a$, the bottom convolution of which is splayed outward at its lower edge as shown at $b$ in the section at Fig. 2. Over the said convolution is slipped a plate $c$ by which the spring is secured in the required position, the aperture being made of larger diameter at one side of the plate than at the other in order that it may effectually grip the splayed-out portion of the spring without requiring the latter to project beyond the inner or lower face of the plate. The plate may be perforated to receive holding down bolts $d$ as in Fig. 1, or it may be gripped by clamps $e$ as shown in Figs. 3 and 4. Into the upper convolution of the spring is inserted a head $f$ of wood, rubber, metal or fiber. The portion $g$ of the head which enters the convolution may be formed with a longitudinal slit, and into the said portion is inserted a wood or other screw $h$ which when screwed home expands the slit portion of the head and by expanding the same tightly against the inner side of the said convolution causes the head to be firmly secured in position.

A shock absorbing device as above described is simple in construction and effective in service.

In Figs. 1 and 2 the invention is shown applied to act as a buffer between the chassis or underframe of a motor vehicle and an axle. The plate $c$ is secured to a pair of blocks $i$ which embrace the axle $j$ and are arranged alongside the usual main spring $k$. The head $f$ is situated immediately beneath a portion of the underframe $l$. In the event of an excessive shock which the spring $k$ is incapable of absorbing the spring $a$ comes into action and acts as a buffer between the underframe and the axle.

In Fig. 3 the shock absorber is shown situated between an underframe $l$ and a laminated spring $k$.

In Fig. 4 the shock absorber is shown situated between a pair of laminated springs $k$.

Figure 5:
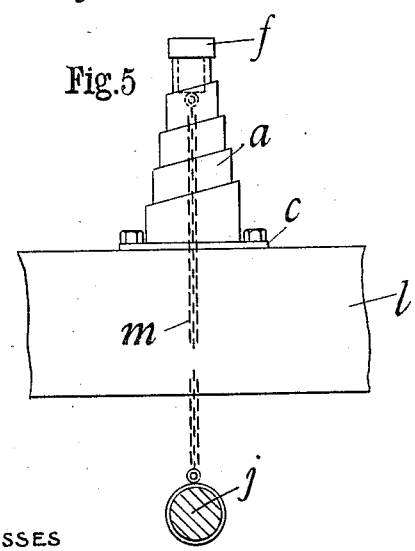

In Fig. 5 the device is shown mounted on an underframe $l$ and attached to the axle $j$ through a chain or other flexible connection $m$. In this arrangement the function of the shock absorber is exactly opposite to that shown in Figs. 1 and 2 inasmuch as the absorber resists separation of the axle and underframe, whereas in the other arrangement mentioned the absorber resists approach or coming together of the said parts.

Figure 6:
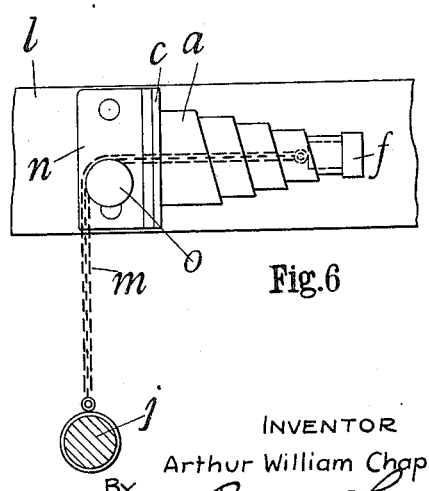

Fig. 6 shows an arrangement which acts similarly to that of Fig. 5, the only difference being that the absorber is mounted alongside the underframe on a bracket $n$ and the chain passes around a pulley $o$.

Having thus described my invention what I claim as new and desire to secure by Letters Patent is:—

1. In shock absorbers for road vehicles, the combination comprising a volute spring, an attachment plate at one end of the spring, a head inserted in the other end of the spring, the portion within the spring being divided, and means for expanding said divided portion for securing the head within the spring, substantially as described.

2. In shock absorbers for road vehicles, the combination comprising a volute spring having one end splayed out, an attachment plate formed with an aperture adapted to engage said splayed-out portion, a head inserted in the other end of the spring, the portion within the spring being divided, and a screw for expanding said divided portion and securing the head within the spring, substantially as described.

In testimony whereof I have signed my name to this specification in the presence of two subscribing witnesses.

ARTHUR WILLIAM CHAPMAN.

Witnesses:
  JOHN MORGAN,
  FRANCIS MALPAS.

Copies of this patent may be obtained for five cents each, by addressing the "Commissioner of Patents, Washington, D. C."